United States Patent
Eden

(10) Patent No.: US 6,718,339 B2
(45) Date of Patent: Apr. 6, 2004

(54) SYSTEM AND METHOD FOR CONTROLLING A PROFILE'S LIFETIME IN A LIMITED MEMORY STORE DEVICE

(75) Inventor: Guy Eden, Tustin Ranch, CA (US)

(73) Assignee: Sharp Laboratories of America, Inc., Camas, WA (US)

(*) Notice: Subject to any disclaimer, the term of this patent is extended or adjusted under 35 U.S.C. 154(b) by 254 days.

(21) Appl. No.: 09/944,658

(22) Filed: Aug. 31, 2001

(65) Prior Publication Data

US 2003/0154218 A1 Aug. 14, 2003

(51) Int. Cl.[7] .............................................. G06F 17/30
(52) U.S. Cl. ....................................... 707/102; 370/351
(58) Field of Search ............................ 707/102; 370/351

(56) References Cited

U.S. PATENT DOCUMENTS

| | | | |
|---|---|---|---|
| 5,644,486 A | * | 7/1997 | Chang et al. .................. 700/3 |
| 5,742,905 A | * | 4/1998 | Pepe et al. ................... 455/461 |
| 5,754,938 A | * | 5/1998 | Herz et al. ................... 725/116 |
| 5,825,865 A | | 10/1998 | Oberlander et al. ......... 379/211 |
| 5,899,995 A | * | 5/1999 | Millier et al. ................ 707/102 |
| 6,219,702 B1 | * | 4/2001 | Ikehara et al. .............. 709/224 |
| 6,263,064 B1 | * | 7/2001 | O'Neal et al. ......... 379/201.03 |
| 6,343,287 B1 | * | 1/2002 | Kumar et al. ................. 707/4 |
| 6,381,735 B1 | * | 4/2002 | Hunt .......................... 717/158 |
| 6,597,684 B1 | * | 7/2003 | Gulati et al. ................ 370/351 |
| 2002/0046259 A1 | * | 4/2002 | Glorikian .................... 709/218 |
| 2002/0085701 A1 | * | 7/2002 | Parsons et al. ......... 379/211.01 |
| 2002/0150093 A1 | * | 10/2002 | Ott et al. .................... 370/389 |

OTHER PUBLICATIONS

Semeria et al, SpC: Synthesis of Pointers in C, 1998 ACM 1–58113–008–2/98/0011.*

Haahr, et al, Supporting CORBA Applications in a Mobile Environment, ACM 1999, 1–58113–142–9/98/08.*

* cited by examiner

*Primary Examiner*—Wayne Amsbury
(74) *Attorney, Agent, or Firm*—David C. Ripmas; Matthew D. Rabdau

(57) ABSTRACT

A method is provided for maintaining profiles in a device store. The method comprises: setting a profile type; selecting profile parameters such as destinations and processes; adding the profile to a device store; and, in response to creating the profile, limiting the lifetime of the profile in the device store. Time aging profiles, single-use profiles, renewable profiles, and permanent profiles can be selected. When a time aging profile is chosen, a time-to-live (TTL) variable, referenced to the creation of the profile, is also selected. Then, the profile is purged from the store when the TTL variable expires. When a single-use profile is chosen, the profile is purged from the store after the profile is used a first time. When a renewable profile is chosen, a TTL variable is selected that is reset in response to using the profile. The profile is purged from the store if the TTL variable expires.

26 Claims, 3 Drawing Sheets

| PROFILE PARAMETERS | | |
|---|---|---|
| DESTINATIONS | PROCESSES | LIFETIME |
| TELEPHONE NUMBERS<br>EMAIL ADDRESSES<br>IP ADDRESSES<br>GEO LANDMARKS<br>STREET ADDRESSES<br>NAME | PRINTING<br>SCANNING<br>FAXING<br>TEST DATA<br>VOICE MESSAGE<br>NAVIGATING | SINGLE-USE<br>PERMANENT<br>TTL |

SYSTEM AND METHOD FOR CONTROLLING A PROFILE'S LIFETIME IN A LIMITED MEMORY STORE DEVICE

BACKGROUND OF THE INVENTION

1. Field of the Invention

This invention generally relates to electronic communication devices with memory and, more particularly, to an improved system and method for limiting the memory required to store profiles in electronic communication devices.

2. Description of the Related Art

U.S. Pat. No. 5,825,865 (Oberlander et al.) discloses a method that supports an information profile for at least one user in a communication system. This information profile includes at least some user preferences regarding a plurality of different user destinations. The communication system will automatically select a destination from amongst a plurality of candidate destinations for a message intended for the user as a function, at least in part, of the information profile. The method itself provides for accessing this communication system, and providing a temporary over-ride instruction to the communication system to temporarily over-ride at least one element in the information profile.

This invention is not particularly efficient in the use of profile stores when different users lack simultaneously access to a scanner/printer. Both temporary and original profiles need to be kept in the store. Thus, the store can become rapidly filled to capacity.

Given a profile container or store, and one or more clients who are the users of this store, it is typical for clients to post destinations to the store for a later use. It is also typical that the profile store is space limited, and can only contain a few hundred profiles. Thus, the store is not especially robust, becoming exhausted once the users post the maximum number of profiles. Alternately, a robust store can be created if the user periodically deletes profiles, in order to keep the list from overloading. Another impractical alternative is the creation of larger memories to make a larger store.

A destination store typically does not have access to an external server, and cannot look up destinations on a remote store, for example, using a lightweight directory assistance protocol (LDAP). In prior art systems, all profiles in such stores are permanent profiles. Once a profile is posted to the device, it will persist until a user, or the system administrator removes the profile. This results in profile store exhaustion as soon as the profile store is full. From that point on, users must delete an old profile before they can enter a new one. Conventionally, the user must be able to perform a successful query operation in the profile store prior to completing their task. For example, the user must be able to retrieve a destination in the scanner, prior to scanning to that destination.

It would be advantageous if there was capacity in a store for more profiles, without the creation of larger store memories or without the need for manually cleaning the system.

It would be advantageous if another type of profile existed which used the store container space more economically.

It would be advantageous if unused profiles could be automatically deleted to make room in the store for new profiles. It would be advantageous if these unused profiles could be deleted without user intervention.

SUMMARY OF THE INVENTION

The invention relates to an improved process for creating and storing profiles in a device with a limited and small store. If a store becomes exhausted, users can no longer add destinations, or other profile parameters, and the device becomes unusable. The present invention advances the state of the art in that it provides a way to automatically control infrequently used profiles in the store. More specifically, the invention introduces profile types. In addition to permanent, or frequently used profiles, the user has the capability to create temporary profiles. The temporary profiles are deleted automatically without user intervention. Thus, the number of profiles in the store is controlled, without the need of a user, or super user to periodically clean the system.

Accordingly, a method is provided for maintaining profiles in a device store, for such devices as multifunction printers (MFPs), wireless communications devices, and answering machines. The method comprises: setting a profile type; selecting profile parameters such as destinations and processes; adding the profile parameters to a device store; and, in response to creating the profile, limiting the lifetime of the profile in the device store.

For example, for a wireless telephone the profile can be a telephone number or email address. For a network-connected scanner the profile can be an IP address destination and a process such as scanning, printing, or faxing.

Setting a profile type includes selecting a profile from the group including time aging profiles, single-use profiles, renewable profiles, and permanent profiles. When a time aging profile is chosen, a time-to-live (TTL) variable, referenced to the creation of the profile, is also selected. Then, the profile is purged from the store when the TTL variable expires. When a single-use profile is chosen, the profile is purged from the store after the profile is used a first time. When a renewable profile is chosen, a TTL variable is selected that is reset in response to using the profile. The profile is purged from the store if the TTL variable expires. When a permanent profile is chosen, the profile is purged from the store in response to explicit delete operations.

Additional details of the above-described method, and a memory limited, profile-using device are described below.

DETAILED DESCRIPTION OF THE PREFERRED EMBODIMENTS

Some portions of the detailed descriptions that follow are presented in terms of procedures, steps, logic blocks, processing, and other symbolic representations of operations on data bits within a computer memory or processor. These descriptions and representations are the means used by those skilled in the data processing arts to most effectively convey the substance of their work to others skilled in the art. A procedure, computer executed step, application, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "connecting" or "translating" or "displaying" or "prompting" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figures 1, 2:
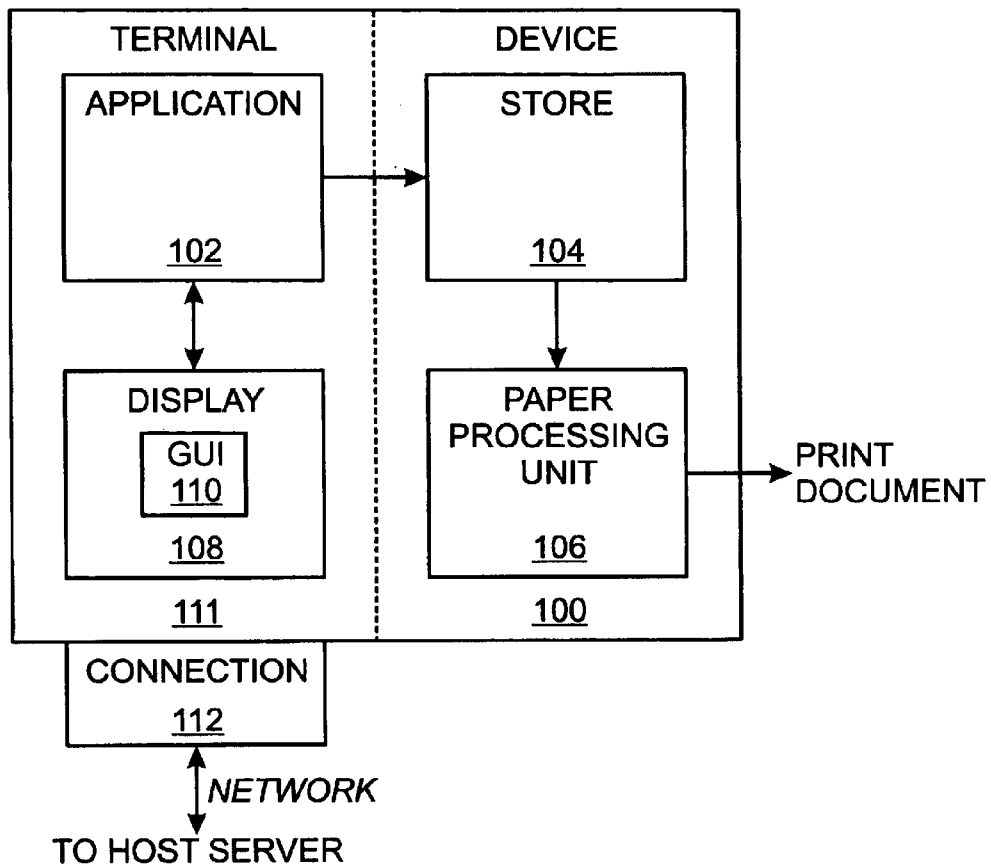
FIG. 1 is a schematic block diagram of the present invention profile-using device having a limited memory.
FIG. 2 is a chart depicting profile parameters.

FIG. 1 is a schematic block diagram of the present invention profile-using device having a limited memory. The device 100 comprises an application 102 for creating limited lifetime profiles and a device store 104 for storing the limited lifetime profiles.

FIG. 2 is a chart depicting profile parameters. The application creates profiles with parameters selected from the group including destinations and processes. For example, when the device is a wireless communications device, the application creates profile destination parameters selected from the group including telephone numbers and email addresses. Returning briefly to FIG. 1, the wireless device store 104 includes telephone number and email address profile destination parameters. Another destination parameter (see FIG. 2) is an IP address, such as would be used for a computer or scanner connected to an intranet or the Internet.

When the device is a printer or MFP, the application creates profile process parameters selected from the group including printing, scanning, and faxing. A printer, as defined herein, is typically a MFP device. In FIG. 1, a printing device store 104 includes printing, scanning, and faxing profile process parameters. The printing device 100 would further comprise a paper processing unit 106 to supply document printouts in response to profiles in the printing device store 104. It should be understood that some profiles include both destinations and processes. In the above example, the profile could include the process of faxing and destination telephone number to which the fax is sent.

In another example, the device 100 is a personal digital assistant (PDA). Returning to FIG. 2, the application creates profile process parameters selected from the group including text data such as SMS messages or email, and voice messages. The application also creates profile destination parameters selected from the group including phone numbers, names, and email addresses. Returning to FIG. 1, the PDA store 104 includes the profile destination and process parameters. When the device 100 is a phone answering machine, the application 102 creates voice messages and the phone answering machine store 104 includes the voice message profile process parameters.

In another example, the device 100 is in a global positioning satellite (GPS) navigational device. The application 102 creates profile destination parameters selected from geographical landmarks and street addresses (see FIG. 2), and navigation process parameters. The navigational device store 104 includes the geographical landmark and street address profile destination parameters, and navigation profile process parameters.

The device 100 typically includes a display 108 connected to the application 102. The application 102 creates a graphical user interface (GUI) dialog box 110 for setting a profile type and for selecting profile parameters. It should be noted that not all profile parameters need be created by a user. As is well known, the GUI may include a touch screen or associated keypad or mouse (not explicitly shown). The application 102 limits the lifetime of the profile in response to GUI prompts on the display 108. The application creates a profile lifetime parameter in response to the set profile type (see FIG. 2), and device store 104 stores the profile lifetime parameter. In some aspects of the invention the application 102, display 108, and GUI 110 are part of a local terminal 111, physically attached to the device 100, such as in a wireless communications device. Alternately, the application 102, display 108, and GUI 110 are part of a remote terminal 111 electrically connected to the device 100, such as a network-connected computer terminal creating profiles for a network-connected device printer. It should be understood that if the terminal 111 is remote, the device may have a separate application for store maintenance operations. In the above-described scenario the maintenance application can be considered integral to the store, and is not explicitly shown. To simplify the description, it will be assumed in the following discussion that both remote and local terminals are part of the device 100.

Figure 3:
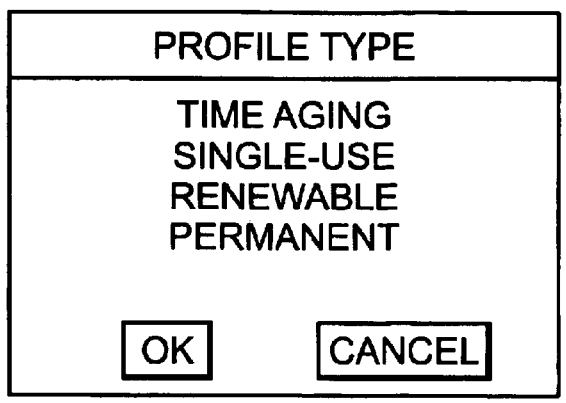
FIG. 3 is an illustration of a possible profile selection GUI.

FIG. 3 is an illustration of a possible profile selection GUI. The GUI 110 generates profile types selecting from the group including time aging profiles, single-use profiles, renewable profiles, and permanent profiles.

Figure 4:
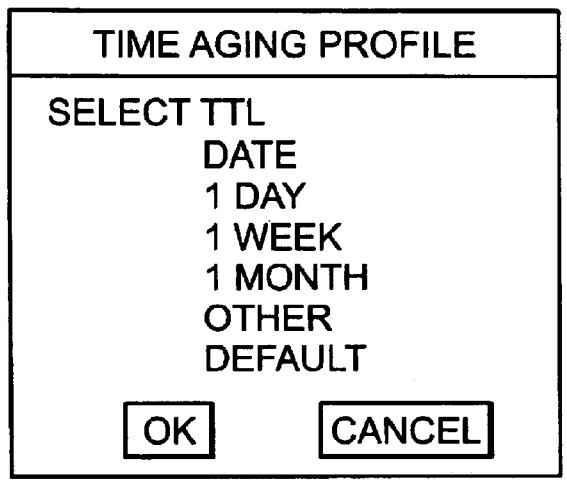
FIG. 4 is an illustration of a possible time aging profile GUI.

FIG. 4 is an illustration of a possible time aging profile GUI. When a time aging profile is picked in response to GUI prompts, the GUI 110 then generates prompts to select a time-to-live (TTL) variable, referenced to the creation of the profile. The application purges the profile from the store when the TTL variable expires.

Figure 5:
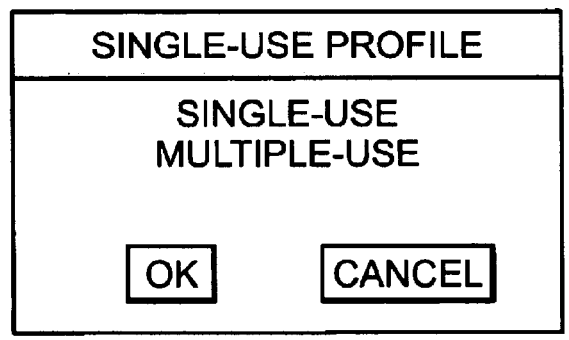
FIG. 5 is an illustration of a possible single-use profile GUI.

FIG. 5 is an illustration of a possible single-use profile GUI. When a single-use profile is picked in response to GUI prompts, the application purges the profile from the store after the profile is used a first time. In some aspects of the invention, the user can select a multiple-use profile that is purged, for example, after three uses.

Figure 6:
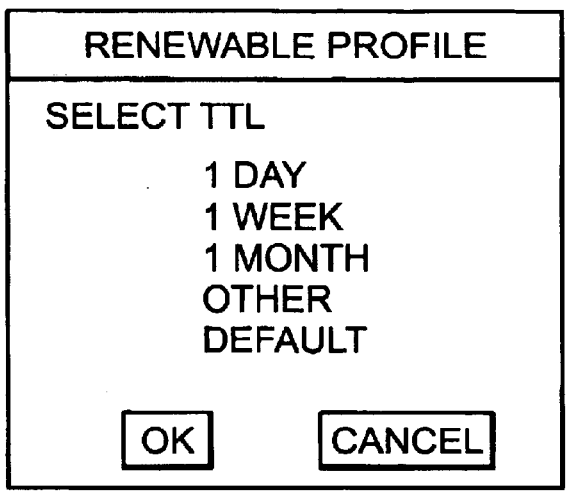
FIG. 6 is an illustration of a possible renewable profile GUI.

FIG. 6 is an illustration of a possible renewable profile GUI. A renewable profile is picked in response to GUI prompts. The GUI supplies prompts to select a TTL variable that is reset in response to using the profile. The application purges the profile from the store if the TTL variable expires. Thus, the profile can become permanent if it is used often.

Figure 7:
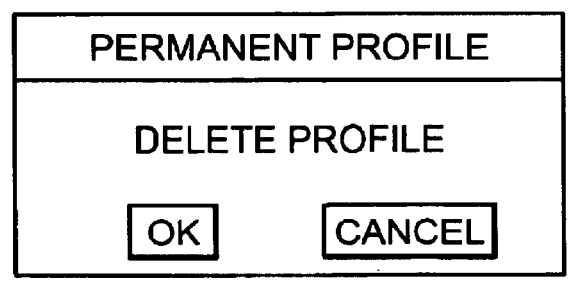
FIG. 7 is an illustration of a possible permanent profile GUI.

FIG. 7 is an illustration of a possible permanent profile GUI. The permanent profile is selected in response to GUI prompts (see FIG. 3). The GUI also supplies prompts to explicitly delete permanent profiles. The application purges the profile from the store in response to explicit delete operations. Although the figure shows a GUI with prompts to delete the profile, the profile could also be deleted using DOS commands.

Returning to FIG. 1, in some aspects of the invention the device 100 further comprising a connection 112 for accessing a network host server (not shown) having a plurality of profile types. The GUI 110 supplies prompts in response to the profile types and profile parameters offered by the accessed host server. The application downloads profile parameters and type variables from the host server in response to the GUI prompts selecting a profile. Then, the GUI 110 supplies prompts to select variables, similar to the illustrations described above.

The present invention introduces the concept of temporary profile types. A profile is defined as temporary when it is created, before it is stored. As mentioned above, the three types of temporary profiles are: time aging profiles; single-usage profiles; and, renewable profiles. Thus, each profile has criteria defined by the initiator of the profile, that is sent as a profile parameter to the device store.

To use the present invention, a rigid handshake is required with the store. The store must be informed when a profile has been used. However, a distinction must be made between looking up a profile, and using it. A device can lookup all N profiles in a store, but then use only a subset of them. This would not change the state of all N profiles in the store. Only the state of the profile subset actually used would change.

Once the store has been informed that a profile has been used, the store takes the following actions:
   if the profile is a single-use profile, the store removes the profile from the store; and,
   if the profile is a renewable profile, the store resets the WTL for that profile.

The store has scheduled cleanup tasks. A cleanup task is a task that is scheduled automatically, without user intervention. The task traverses all profiles and deletes profiles with an expired TTL. If the profile is a renewable profile, the TTL has been preset by the store at the last usage of that profile. If the profile is a time aging profile, the TTL is set at the time of issue and is constant for the whole lifetime of the profile.

The TTL is a date set in the future. For an aging profile to expire, the TTL must expire. That is, be a time in the past. The device must pass the TTL as a lifetime parameter to the store at the time the profile is added to the store.

Given an external server that hosts numerous profiles, a user in one embodiment of the invention could go to the server through the device, or through a remote terminal, and lookup a profile. The user would then set the desired profile type. At that point in time, the device would download the profile parameters and profile type variables. The device or remote terminal GUI then prompts the user for the type of profile to be setup in the store. The user can choose the above-mentioned types, and can select from destination and process variables. The above-mentioned network embodiment of the invention could be enabled using a LDAP, for example. This host server option permits a user to use numerous profiles, adding them all as temporary, without clogging the device (local) store.

Figure 8:
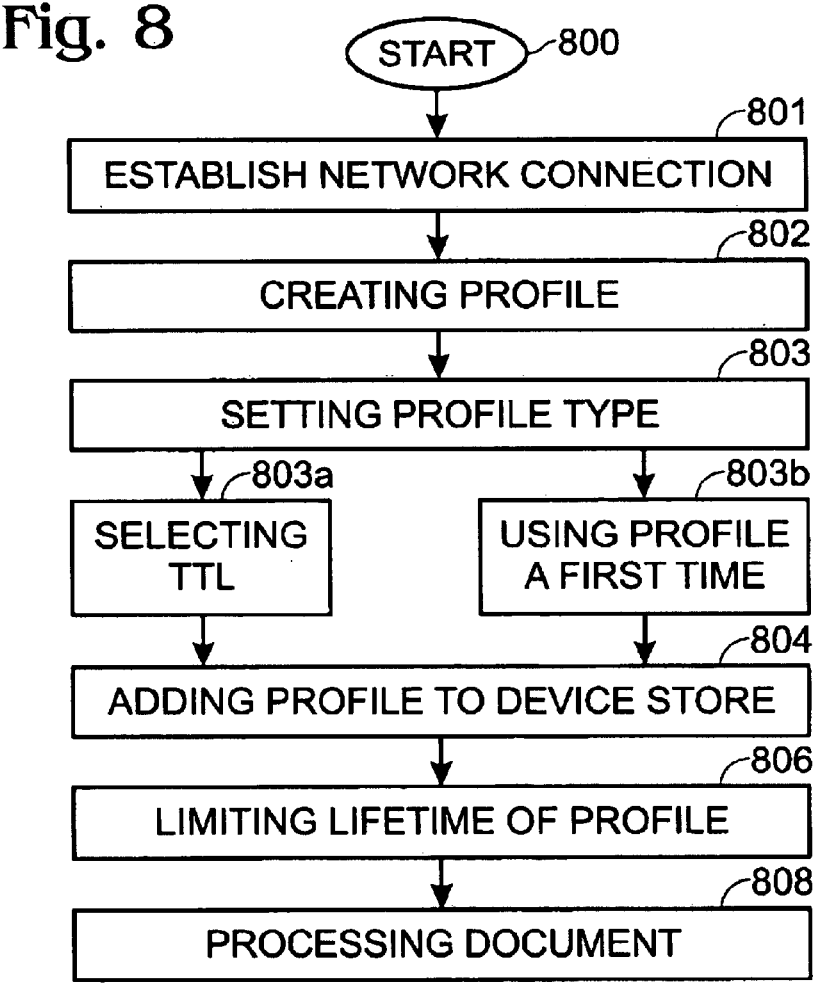
FIG. 8 is a flowchart illustrating the present invention method for maintaining profiles in a device store.

FIG. 8 is a flowchart illustrating the present invention method for maintaining profiles in a device store. Although the method is depicted as a sequence of numbered steps for clarity, no order should be inferred from the numbering unless explicitly stated. The method begins at Step 800. Step 802 creates a profile. Step 804 adds the profile to a device store. Step 806, in response to creating the profile, limits the lifetime of the profile in the device store.

Creating a profile in Step 802 includes creating profile parameters selected from the group including destinations and processes. For example, in a wireless communications device, creating destination parameters includes selecting from the group including telephone numbers and email addresses. Then, adding the profile to a device store in Step 804 includes adding the profile parameter telephone numbers and email addresses to the wireless communications device store (memory). Step 804 also includes creating destination parameters selected from the group including IP addresses, telephone numbers, names, and email addresses.

In another example using a printing device, creating profile process parameters in Step 802 includes creating process parameters selected from the group including printing, scanning, and faxing. Then, adding the profile to a device store in Step 804 includes adding the profile destination and process parameters to the printing device store. A further step, Step 808, in response to the profile, processes a document at the printing device.

In an example using a PDA device, creating profile process parameters in Step 802 includes creating profile process parameters selected from the group including text data and voice messages. Creating profile destination parameters includes selecting from the group including phone numbers and email addresses. Adding the profile to a device store in Step 804 includes adding the profile destination and process parameters to the PDA device store.

When the device is a telephone answering machine, creating profile process parameters in Step 802 includes creating voice messages profile process parameters. Adding the profile to a device store in Step 804 includes adding the profile process parameters to the phone answering machine store.

When the device is a GPS navigational device, creating profile destination parameters includes creating profile destination parameters selected from the group including geographical landmarks and street addresses. Adding the profile to a device store in Step 804 includes adding the profile destination parameters to the GPS navigational device store.

The method includes a further step. Step 803 sets a profile type. Then, adding the profile to a device store in Step 804 includes adding a profile lifetime as a profile parameter. Step 806 stores the lifetime parameter with the rest of the profile in the device store, and limiting the lifetime of the profile in store in Step 806 includes limiting the lifetime of the profile in response to the profile lifetime parameter.

Setting a profile type in Step 803 includes selecting a profile from the group including time aging profiles, single-use profiles, renewable profiles, and permanent profiles.

When a time aging profile is selected in Step 803, the method comprises a further step. Step 803a selects a time-to-live (TTL) variable referenced to the creation of the profile. Limiting the lifetime of the profile in store in Step 806 includes purging the profile from the store when the TTL variable expires.

When a single-use profile is selected in Step 803, a further step, Step 803b uses the profile a first time. Limiting the lifetime of the profile in Step 806 includes purging the profile from the store after the profile is used a first time in Step 803b.

When a renewable profile is selected in Step 803, Step 803a selects a TTL variable that is reset in response to using the profile. Limiting the lifetime of the profile in Step 806 includes purging the profile from the store if the TTL variable expires.

When a permanent-profile is selected in Step 803, limiting the lifetime of the profile in Step 806 includes purging the profile from the store in response to explicit delete operations, such as GUI prompts or DOS commands to delete the profile.

In some aspects of the invention, a host server is included. A further step, Step 801, establishes a network connection with a host server having a plurality of profile types. Then, setting a profile type in Step 803 includes substeps (not shown). Step 803c accesses the host server. Step 803d selects an offered profile type. Step 803e downloads profile parameters and profile type variables. Step 803f selects profile parameters and the profile type variables to create a profile. Then, Step 804 adds the profile to the device store.

A method and device for efficiently maintaining a device store is provided. A number of device examples, with profile parameters have been suggested. However, the present invention is not limited to just these examples. Likewise, a few profile types have been listed as examples. Again, however, the invention is not limited to merely the listed types. Other variations and embodiments will occur to those skilled in the art.

We claim:

1. A method for maintaining profiles in a device store, the method comprising:
   creating a profile group including destinations and processes, and selecting from that group;
   setting a profile type selected from the group including time aging profiles, single-use profiles, renewable profiles, and permanent profiles;
   adding the profile, with a profile lifetime as a profile parameter, to a device store; and,
   limiting the lifetime of the profile in the device store in response to the profile lifetime parameter.

2. The method of claim 1 in which the device is a wireless communications device;
   wherein creating profile destination parameters includes creating destination parameters selected from the group including telephone numbers and email addresses; and,
   wherein adding the profile to a device store includes adding the profile parameter telephone numbers and email addresses to the wireless communications device store.

3. The method of claim 1 wherein creating profile destination parameters includes creating destination parameters selected from the group including IP addresses, telephone numbers, names, and email addresses.

4. The method of claim 1 in which the device is a printer;
   wherein creating profile process parameters includes creating process parameters selected from the group including printing, scanning, and faxing.

5. The method of claim 4 adding the profile to a device store includes adding the profile destination and process parameters to the printing device store; and
   the method further comprising:
      in response to the profile, processing a document at the printing device.

6. The method of claim 1 in which the device is a personal digital assistant (PDA);
   wherein creating profile process parameters includes creating profile process parameters selected from the group including text data and voice messages;
   wherein creating profile destination parameters includes creating profile destination parameters selected from the group including phone numbers and email addresses; and,
   wherein adding the profile to a device store includes adding the profile destination and process parameters to the PDA device store.

7. The method of claim 1 in which the device is a telephone answering machine;
   wherein creating profile process parameters includes creating voice message profile process parameters; and,
   wherein adding the profile to a device store includes adding the profile process parameters to the phone answering machine store.

8. The method of claim 1 in which the device is a global positioning satellite (GPS) navigational device;
   wherein creating profile destination parameters includes creating profile destination parameters selected from geographical landmarks and street addresses; and,
   wherein adding the profile to a device store includes adding the profile destination parameters to the GPS navigational device store.

9. The method of claim 1 wherein setting a profile type includes selecting a time aging profile; and
   the method further comprising:
      selecting a time-to-live (TTL) variable referenced to the creation of the profile; and,
      wherein limiting the lifetime of the profile in store includes purging the profile from the store when the TTL variable expires.

10. The method of claim 1 wherein setting a profile type includes selecting a single-use profile;
    the method further comprising:
       using the profile a first time; and
       wherein limiting the lifetime of the profile includes purging the profile from the store after the profile is used a first time.

11. The method of claim 1 wherein setting a profile type includes selecting a renewable profile; and
    the method further comprising:
       selecting a TTL variable that is reset in response to using the profile; and,
       wherein limiting the lifetime of the profile includes purging the profile from the store if the TTL variable expires.

12. The method of claim 1 wherein setting a profile type includes selecting a permanent profile; and
    wherein limiting the lifetime of the profile includes purging the profile from the store in response to explicit delete operations.

13. The method of claim 1 further comprising:
    establishing a network connection with a host server having a plurality of profile types;
    wherein setting a profile type includes:
       accessing the host server;
       selecting an offered profile type;
       downloading profile parameters and profile type variables; and,
       selecting profile parameters and the profile type variables to create a profile.

14. A profile-using device with limited memory comprising:
    an application for creating a limited lifetime profile parameter group including destinations and processes and selecting from that group, the application creating a graphical user interface (GUI) dialog box for setting a profile type selected from the group including time aging profiles, single-use profiles, renewable profiles, and permanent profiles, and for selecting profile parameters, including a profile lifetime parameter responsive to the set profile type;
    a display connected to the application to display GUI prompts; and, a device store for storing the limited lifetime profiles with the profile lifetime parameter.

15. The device of claim 14 in which the device is a wireless communications device;

wherein the application creates profile destination parameters selected from the group including telephone numbers and email addresses; and, wherein the wireless device store includes telephone number and email address profile destination parameters.

16. The device of claim 14 wherein the application creates profile destination parameters selected from the group including IP addresses, telephone numbers, names, and email addresses.

17. The device of claim 14 wherein the application creates profile process parameters selected from the group including printing, scanning, and faxing.

18. The device of claim 17 in which the device is a printing device;

wherein the printing device store includes printing, scanning, and faxing profile process parameters; and, the device further comprising:

a paper processing unit to supply document printouts in response to profiles in the printing device store.

19. The device of claim 14 in which the device is a personal digital assistant (PDA);

wherein the application creates profile process parameters selected from the group including text data and voice messages;

wherein the application creates profile destination parameters selected from the group including phone numbers and email addresses; and, wherein PDA store includes the profile destination and process parameters.

20. The device of claim 14 in which the device is a phone answering machine;

wherein the application creates profile process parameters selected from the group including voice messages; and, wherein the phone answering machine store includes the voice message profile process parameters.

21. The device of claim 14 in which the device is in a global positioning satellite (GPS) navigational device;

wherein the application creates profile destination parameters selected from geographical landmarks and street addresses; and, wherein the navigational device store includes the geographical landmark and street address profile destination parameters.

22. The device of claim 14 in which a time aging profile is picked in response to GUI prompts;

wherein the GUI generates prompts to select a time-to-live (TTL) variable, referenced to the creation of the profile; and, wherein the application purges the profile from the store when the TTL variable expires.

23. The device of claim 14 in which a single-use profile is picked in response to GUI prompts;

wherein the application purges the profile from the store after the profile is used a first time.

24. The device of claim 14 in which a renewable profile is picked in response to GUI prompts;

wherein the GUI supplies prompts to select a TTL variable that is reset in response to using the profile; and, wherein the application purges the profile from the store if the TTL variable expires.

25. The device of claim 14 in which a permanent profile is selected in response to GUI prompts;

wherein the GUI supplies prompts to explicitly delete permanent profiles; and wherein the application purges the profile from the store in response to an explicit delete operation.

26. The device of claim 14 further comprising:

a connection for accessing a network host server with a plurality of profile types;

wherein the GUI supplies prompts in response to the profile types and profile parameters offered by the accessed host server;

wherein the application downloads profile parameters and type variables from the host server in response to the GUI prompts; and, wherein the GUI supplies prompts to select the profile variables.

* * * * *